(12) United States Patent
Fludkov et al.

(10) Patent No.: US 9,106,922 B2
(45) Date of Patent: Aug. 11, 2015

(54) MOTION ESTIMATION ENGINE FOR VIDEO ENCODING

(71) Applicants: Mikhail Fludkov, Saint Petersburg (RU); Mikhail Kan, Saint Petersburg (RU); Sergey Pyko, Saint Petersburg (RU); Nickolay Terterov, Saint Petersburg (RU)

(72) Inventors: Mikhail Fludkov, Saint Petersburg (RU); Mikhail Kan, Saint Petersburg (RU); Sergey Pyko, Saint Petersburg (RU); Nickolay Terterov, Saint Petersburg (RU)

(73) Assignee: Vanguard Software Solutions, Inc., Los Altos, CA (US)

( * ) Notice: Subject to any disclaimer, the term of this patent is extended or adjusted under 35 U.S.C. 154(b) by 0 days.

(21) Appl. No.: 13/836,174

(22) Filed: Mar. 15, 2013

(65) Prior Publication Data

US 2014/0169472 A1    Jun. 19, 2014

Related U.S. Application Data

(60) Provisional application No. 61/739,594, filed on Dec. 19, 2012.

(51) Int. Cl.
| | | |
|---|---|---|
| *H04B 1/66* | (2006.01) | |
| *H04N 7/12* | (2006.01) | |
| *H04N 11/02* | (2006.01) | |
| *H04N 11/04* | (2006.01) | |
| *H04N 19/42* | (2014.01) | |
| *H04N 19/52* | (2014.01) | |
| *H04N 19/139* | (2014.01) | |
| *H04N 19/119* | (2014.01) | |
| *H04N 19/61* | (2014.01) | |

(52) U.S. Cl.
CPC ............. *H04N 19/42* (2014.11); *H04N 19/119* (2014.11); *H04N 19/139* (2014.11); *H04N 19/52* (2014.11); *H04N 19/61* (2014.11)

(58) Field of Classification Search
CPC .................. H04N 19/00587; H04N 19/00509; H04N 19/0063; H04N 7/2676; H04N 7/361
See application file for complete search history.

(56) References Cited

U.S. PATENT DOCUMENTS

| | | |
|---|---|---|
| 5,640,208 A | 6/1997 | Fujinami |
| 5,671,018 A | 9/1997 | Ohara et al. |
| 5,778,190 A | 7/1998 | Agarwal |
| 5,796,435 A | 8/1998 | Nonomura et al. |

(Continued)

FOREIGN PATENT DOCUMENTS

KR    1020040068535 A    7/2004

OTHER PUBLICATIONS

Alp Erturk and Sarp Erturk,"Two-Bit Transform for Binary Block Motion Estimation", IEEE Transactions on Circuits and Systems for Video Technology—TCSV , vol. 15, No. 7, pp. 938-946, 2005.

(Continued)

*Primary Examiner* — Mehrdad Dastouri
*Assistant Examiner* — Kristin Dobbs
(74) *Attorney, Agent, or Firm* — Fitch, Even, Tabin & Flannery LLP

(57) ABSTRACT

The motion estimation engine has a multi-threaded structure and comprises a preprocessor for rough motion estimation of motion vectors and in-loop motion estimator for creating a coding tree unit, as well as a shared memory for interaction of the pre-processor with the in-loop motion estimator. The coding tree unit is formed by merging neighboring partitions of coding units using a list of best MV candidates.

14 Claims, 3 Drawing Sheets

(56) References Cited

U.S. PATENT DOCUMENTS

| | | | |
|---|---|---|---|
| 5,812,788 | A | 9/1998 | Agarwal |
| 6,044,115 | A | 3/2000 | Horiike et al. |
| 6,055,330 | A | 4/2000 | Eleftheriadis et al. |
| 6,081,554 | A | 6/2000 | Lee et al. |
| 6,091,777 | A | 7/2000 | Guetz et al. |
| 6,233,278 | B1 | 5/2001 | Dieterich |
| 6,263,020 | B1 | 7/2001 | Gardos et al. |
| 6,317,520 | B1 | 11/2001 | Passaggio et al. |
| 6,434,196 | B1 | 8/2002 | Sethuraman et al. |
| 6,438,168 | B2 | 8/2002 | Arye |
| 6,445,828 | B1 | 9/2002 | Vim |
| 6,459,427 | B1 | 10/2002 | Mao et al. |
| 6,483,505 | B1 | 11/2002 | Morein et al. |
| 6,496,607 | B1 | 12/2002 | Krishnamurthy et al. |
| 6,594,395 | B1 | 7/2003 | Forchheimer et al. |
| 6,597,739 | B1 | 7/2003 | Li et al. |
| 6,683,992 | B2 | 1/2004 | Takahashi et al. |
| 6,909,810 | B2 | 6/2005 | Maeda |
| 6,940,903 | B2 | 9/2005 | Zhao et al. |
| 6,965,643 | B1 | 11/2005 | Maeda et al. |
| 7,110,459 | B2 | 9/2006 | Srinivasan |
| 7,336,720 | B2 | 2/2008 | Martemyanov et al. |
| 8,023,562 | B2 | 9/2011 | Zheludkov et al. |
| 2002/0061138 | A1 | 5/2002 | Uenoyama et al. |
| 2003/0063667 | A1 | 4/2003 | Sriram et al. |
| 2003/0231796 | A1 | 12/2003 | Caviedes |
| 2005/0013497 | A1 | 1/2005 | Hsu et al. |
| 2005/0024487 | A1 | 2/2005 | Chen |
| 2005/0286630 | A1 | 12/2005 | Tong et al. |
| 2006/0055826 | A1 | 3/2006 | Zimmermann et al. |
| 2006/0062304 | A1 | 3/2006 | Hsia |
| 2006/0153539 | A1 | 7/2006 | Kaku |
| 2006/0222074 | A1* | 10/2006 | Zhang .................. 375/240.16 |
| 2006/0262860 | A1 | 11/2006 | Chou et al. |
| 2006/0262983 | A1 | 11/2006 | Cheng et al. |
| 2007/0074266 | A1 | 3/2007 | Raveendran et al. |
| 2010/0054331 | A1 | 3/2010 | Haddad et al. |
| 2010/0165077 | A1 | 7/2010 | Yin et al. |
| 2011/0249739 | A1 | 10/2011 | Liu et al. |
| 2012/0243609 | A1 | 9/2012 | Zheng |
| 2012/0257678 | A1 | 10/2012 | Zhou et al. |
| 2013/0022119 | A1* | 1/2013 | Chien et al. ............ 375/240.16 |
| 2013/0156343 | A1* | 6/2013 | Hutchings ................ 382/286 |
| 2014/0064372 | A1* | 3/2014 | Laroche et al. ......... 375/240.16 |
| 2014/0105296 | A1* | 4/2014 | Alshina et al. .......... 375/240.14 |

OTHER PUBLICATIONS

Sarp Erturk and Tae Gyu Chang, "Wavelet Domain One-Bit Transform for Low-Complexity Motion Estimation", IEEE International Symposium on Circuits and Systems—ISCAS , 2006.

Colin Doutre and Panos Nasiopoulos, "Motion Vector Prediction for Improving One Bit Transform Based Motion Estimation", IEEE International Conference on Acoustics, Speech, and Signal Processing (ICASSP 2008), Las Vegas, Nevada, pp. 805-808, Apr. 2008.

Youn-Long Steve Lin, Chao-Yang Kao Huang-Chih Kuo, Jian-Wen Chen, "VLSI Design for Video Coding; H.264/AVC Encoding from Standard Specification to Chip", DOI 10.1007/978-1-4419-0959-6_1, Springer Science+Busines Media, LLC 2010.

Maya Gokhale and Paul S. Graham "Reconfigurable Computing. Accelerating Computation with Field-Programmable Gate Arrays" Springer, 2005.

M. Schindler, A Fast Renormalisation for Arithmetic Coding, Proc. Data Compression Conference, Mar. 30 Apr. 1, 1998, p. 572, Snowbird, Utah, U.S.A.

G. N. N. Martin, Range encoding: an algorithm for removing redundancy from a digitized message, IBM UK Scientific Center (paper presented in Mar. 1979 to the VideoS. Data Recording Coriference held in Southampton Jul. 24-27).

John Watkinson, The Engineer's Guide to Compression, 1996, pp. 62-72, Snell & WHcox Ltd., Sunnyvale, California, U.S.A.

Yao Wang et al., Review of Error ResHient Coding Techniques for Real-Time Video Communications, IEEE Signal Processing Magazine, Jul. 2000, pp. 61-82, vol. 17, No. 4, USA.

Rui Zhang et al., Video Coding with Optimal Inter/Infra-Mode Switching for Packet Loss Resilience, IEE Journal on Selected Areas in Communications, Jun. 2000, pp. 966-976, vol. 18, No. 6, USA.

Minyoung Kim, et al., PBPAIR: An Energy-efficient Error-resilient Encoding Using Probability Based Power Aware Intra Refresh, Mobile Computing and Communications Review Publication, 2006, pp. 58-59, 10(3), Irvine, California, USA.

Gerard De Haan et al., An Efficient True-Motion Estimator Using Candidate Vector From a Parametric Motion Model, Feb. 1998.

International Search Report and Written Opinion for PCT/US2013/046076 dated Sep. 30, 2013.

* cited by examiner

MOTION ESTIMATION ENGINE FOR VIDEO ENCODING

CROSS-REFERENCE TO RELATED APPLICATIONS

This application claims benefit to U.S. Provisional Application No. 61/739,594 filed Dec. 19, 2012, the content of which is incorporated herein by reference in its entirety.

FIELD

This application relates to a motion estimation engine for making coding decisions and estimating coding parameters in high efficiency video coding, preferably for using in H264/265 framework.

BACKGROUND

The development of video encoding technology requires significant hardware resources for providing the high quality of video compression and performance. Motion Estimation is an important part of the encoding process.

The encoding features in High Efficiency Video Coding (HEVC) define selection of Prediction Units (PU) and a process of derivation the Motion Vectors (MV). There are two new features in Inter-HEVC: the powerful mode of merging Coding Units (CU), and representation of coding units as a tree. These features can improve the quality of coding but they require additional efforts and resources to provide it. The main approach to achieve best encoding is by recursive re-calculation of pixels (multi-pass execution).

This approach does not provide efficient hardware implementation because it produces multi-loop structures that restrict the depth of the calculation pipeline and increase the requirements to memory bandwidth: the data is loaded several times because of the cache size restriction.

The pipelines and parallelism are traditional ways of providing a high performance. The depth of the pipeline is defined by the following factors: prediction of current CU that depends on encoding results of the previous CU; and the cycles of recursive calculation, which can be replaced by a parallel calculation. The parallelism, however, requires extra hardware for implementation.

The restrictions of hardware resources define the balance between the parallel and sequential calculation. Some of the restrictions are the scalability of architecture and the capability to support the different memory size and memory organization.

Therefore, there is a need to provide high performance motion estimation combined with good quality and minimum hardware restrictions.

SUMMARY

The need above, as well as other needs, is advantageously addressed through provision of the proposed combination of a motion estimation engine and algorithms. By one approach, the suggested architecture of the motion estimation engine is implemented in FPGA (Field-Programmable Gate Array). The FPGA structure allows using the engine as accelerator or as a part of H264/265 encoder. By another approach, the motion estimation engine is implemented using ASIC (Application-Specific Integrated Circuit) configurations. The motion estimation method is based on single-iterated calculation of Motion Vectors (MV) for all Prediction Units (PU) and Coding Units (CU). The estimation is made for the smallest CUs and used for all the decisions.

The Motion Estimation is a process of generating motion vectors and selecting the best candidates. According to one approach, the size of the list of candidates is variable, and the maximum number of candidates depends on the time available for estimation. In the proposed method two types of candidates are used: one type reflects the Merge Mode; another is for advanced motion vector prediction (AMVP). All candidates are unique. The motion estimation is performed using two parallel processes: the rough search of motion vectors performed by preprocessor, and the final estimation performed by in-loop motion estimator. The rough search produces one of the possible candidates for the AMVP candidate. The rough estimation uses the transformed images, or the images with the reduced bit-depth, and selects the candidates of MV with the help of a double metric of quality. Each candidate produces the prediction for 5 partitions, which are calculated independently from each other. The candidates of the AMVP are adjusted by full searching inside a small window. The selection of the best prediction is made with a penalty function that depends on MV size and the difference between the predicted value and the selected candidate.

The MV estimation is performed with the help of luma samples comparing only one size CU (base CU). The MVs are calculated with q-pel accuracy. The fractional parts are the result of interpolation in the space of SAD predictions rather than of interpolation of samples.

The CUs of other sizes are defined by analyzing the MVs, which were obtained for the base CU using MVs with full-pel accuracy without of using luma samples and estimation of SAD. The MVs are replaced with descriptors. If the descriptors of the neighbors' partitions are equal, the merging of CUs is executed. This produces the structure of the Code Tree Unit (CTU). The fractional parts of MVs of the Code Tree Unit are calculated by weighting the fractional parts of MV of the base CUs.

BRIEF DESCRIPTION OF THE DRAWINGS

The above and other aspects, features and advantages of the proposed combination of hardware and algorithms and related architecture-algorithmic decisions will become more apparent from the following detailed description thereof, particularly when considered in conjunction with the following drawings.

DETAILED DESCRIPTION

It is appreciated that certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

Figure 1:
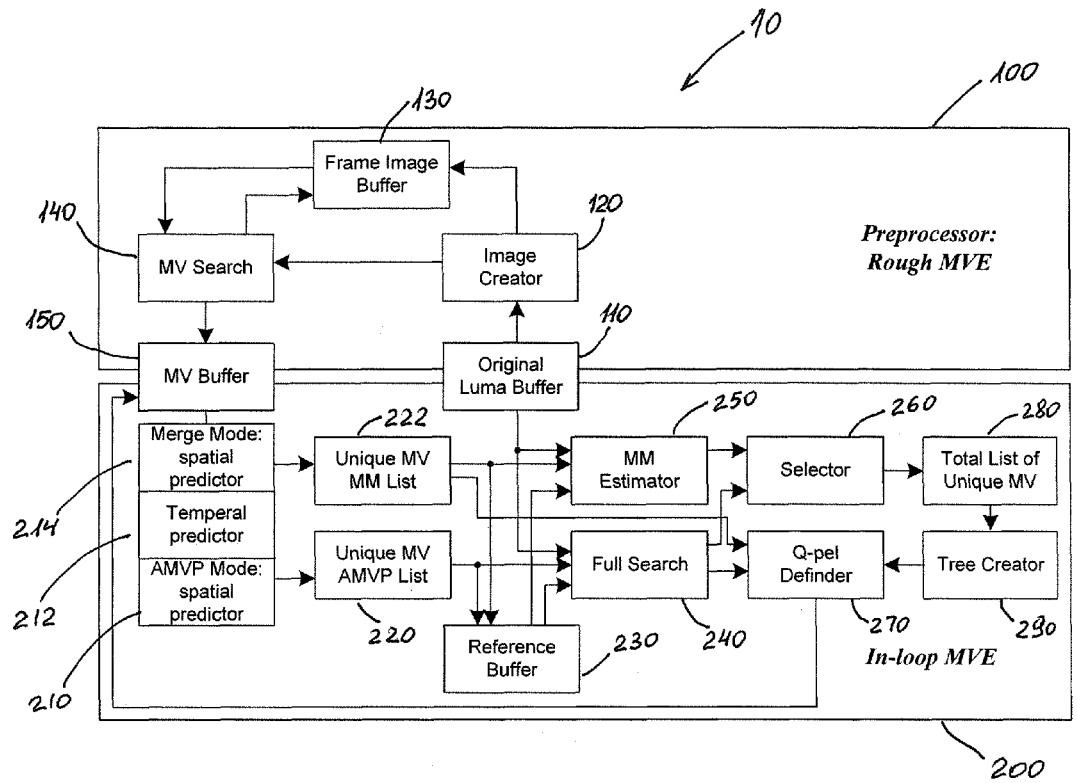
FIG. 1 shows a block-diagram of a motion estimation engine.

Referring now to the drawings, FIG. 1 presents a schematic view of a proposed motion estimation engine 10, which scheme is provided for the purpose of illustration and without intending any limitations in these regards.

The engine has a multi-threaded structure and comprises two main parts: preprocessor 100 for performing rough motion estimation and in-loop motion estimator 200. The control units (microprocessor) and the detailed configuration circuit are not shown for simplicity. The pre-processor and the in-motion estimator can work in parallel with minimal possible time shift (1-2 LCU). This reduces the total latency of motion estimation (ME). The pre-processor 100 uses only the original video and does not depend on the results of encoding. The work of the in-loop motion vector estimator 200 depends on the results of encoding and reconstruction.

The shared memory is used for interaction of the two parts 100 and 200. One part of the memory, Luma Buffer 110 stores the luma samples of the original frames. Another part, MV Buffer 150 stores the motion vectors, which were derived by the Preprocessor 100. The samples from the Luma Buffer 110 are converted by Image Creator 120. The transformed samples are passed to Frame Image Buffer 130 for accumulation of the reference images for searching in the MV search module 140. The search module 140 uses the reference image for defining the best motion estimation. The motion vectors are determined as a result of searching. These vectors are placed into MV buffer 150. The in-loop motion estimator 200 makes an additional search, comparing different predictions and creating the coding tree unit CTU. The estimator for each coding unit CU prepares lists of possible predictions for searching using Spatial Predictor of Merge Mode 214, Advanced Mode Spatial Predictor (AMVP) 210 and Temporal Predictor 212. These modules generate predictions, which are sources for the lists of the unique motion vectors 220 and 222. The CU is loaded from Luma Buffer 110 to merge mode MM estimator 250 and full search module 240. The vectors from the lists of unique motion vectors define regions of reference frames which will be used in the MM estimator 250 and the full search module 240. The reference frames are stored in Reference buffer 230. The MM estimator 250 gets the identification number of the motion vector from the MM list unit 222. The vector defines the location region of reference frame in the Reference buffer 230. The identification number of the motion vector is used for generating a penalty function in order to compare the prediction errors in the MM estimator 250. The result of MM estimation is passed to selector 260 for comparison with the best decision defined by a full search module 240. The full search module 240 gets samples from the Reference buffer 230 for searching of the best position of the CU. The CU is loaded to the search module 240 from the Luma buffer 110. The full search module 240 uses the unique motion vectors from the AMVP list 220 for generating a penalty function. The penalty function is applied for selection of the best AMVP decision. The best AMVP decision from the search module 240 is compared with the best MM decision 250 in the selector 260. The comparison result is placed into the total list of unique MV 280. The Tree Creator 290 scans vectors from the total list of unique MV 280 for merging partitions. As a result, the Tree Creator 290 forms the coding tree unit CTU. The Q-pel definer 270 takes fractional parts of vectors from MM list 222 and the full search module 240. The definer 270 makes the weighted averaging of the fractional parts of the motion vectors. The weighted average is derived from the CTU (output of 290). The motion vectors with q-pel accuracy (output of 270) are saved in MV buffer 150.

Figure 4:
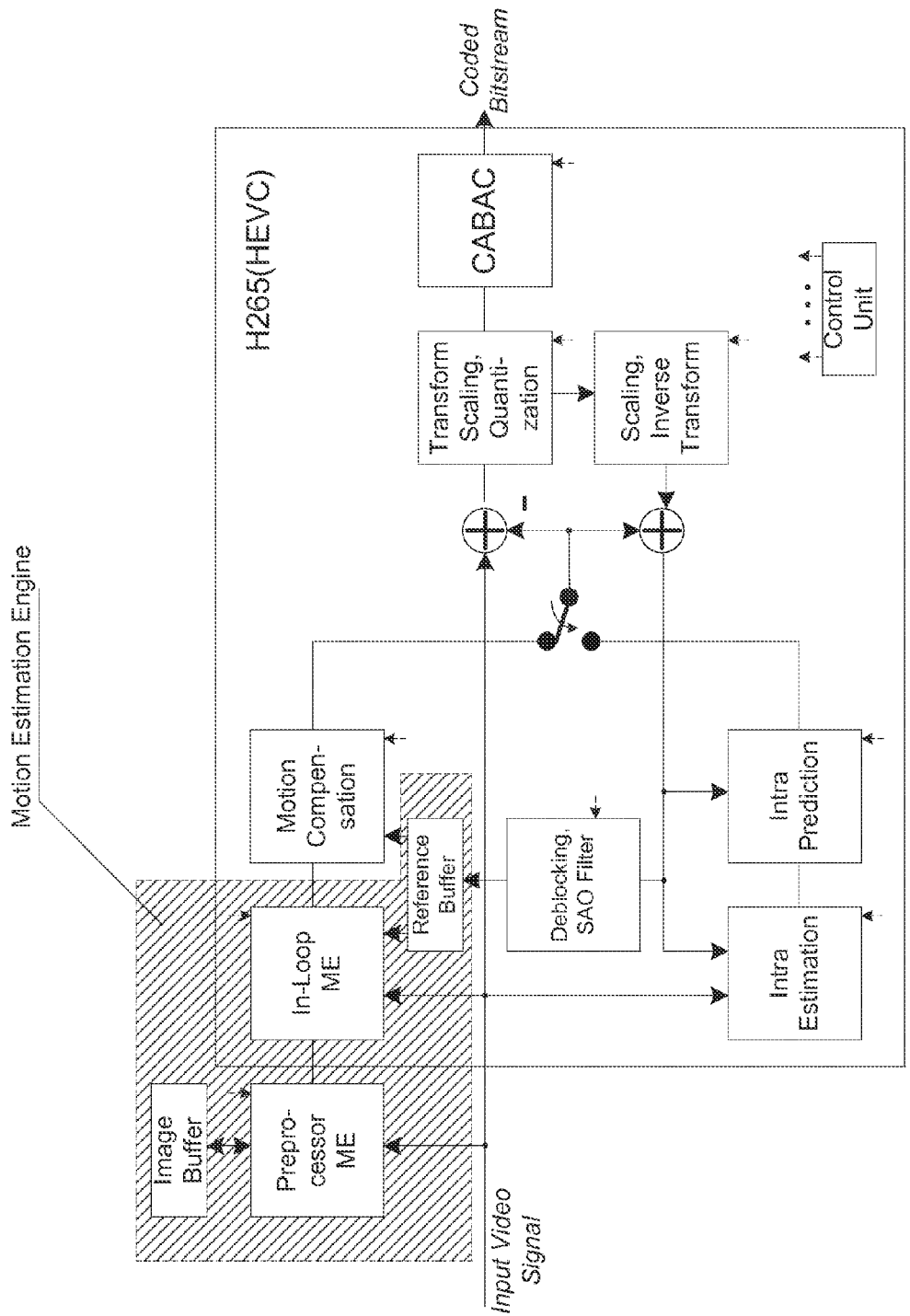
FIG. 4 showing the motion estimation engine hardware unit used as an accelerator for an H264/265 encoder.

Each module of the engine can execute a separate function and work independently (each module works asynchronously and may have its own clock frequency and clock domain). The modules are separated from one another by multi-page buffers. Each module executes its task until it fills in the buffers or runs out of the necessary input data. This reduces the required memory bandwidth by equalizing memory bus load and removes the downtime units. As a result, the engine can provide an increased performance. FIG. 4 illustrates an approach when the motion estimation engine hardware block 10 is used as an accelerator for an H265 (HEVC) encoder 20.

Data Storage Organization

By one approach, the luma and chroma parts of MV are placed in different memory arrays. Only luma is used for the motion search. The separation of luma and chroma prevents loosing of memory bandwidth during the loading of chroma. The data can be separated and stored in the independent data clusters: the original frames, the reference frames (reconstructed frames) and the transformed frames. Preferably, each cluster is placed inside its own physical memory (with independent interface). If the memory interface is shared, each cluster may have its own cache. This reduces the losses on service queue.

The tiling may be used to store the samples of frames. The reference frames and original frames have a different tiling The reference frames are used for searching (the tiling is small), the access to the original frame is according to constant steps (step of access defines the size of tiling). The using of the tiling reduces losses in the overhead burst mode in the dynamic random access memory (DDR3).

The search windows may be tied to the grid matching the memory tiling If the bit depth of pixels is 10, the packaging of 4 pixels into 5 bytes can be used instead of packaging of single pixels into 2 bytes. This reduces the required memory bandwidth to 40%.

The preprocessor uses the transformed frames. The transformed frames have a reduced bit-depth down to several bits. The low bit-depth and pixels packaging into word reduces the required memory bandwidth.

Preprocessor

The rough motion estimation is a very important part of the Inter-prediction. The quality of this stage affects the total prediction quality. The designing of this module is defined by the following features:

high performance;
minimum memory bandwidth;
low hardware requirements;
a big size of the search window;
Q-pel accuracy of ME;
illumination level independence; and
robustness.

There are two main ways to satisfy these requirements: to reduce the volume of the analyzed information and to use high-speed algorithms of searching by reducing the number of the points included into the search.

The volume of the analyzed information can be reduced by scaling of the image or by changing the pixel bit depth. These types of compression depend on the search algorithms. There is a balance between the degree of reduction of the initial information volume, and the possibility of reducing the number of points in a search algorithm. High compression of the initial information requires a full search algorithm while a low degree of the initial compression allows using of high-speed quick search algorithms.

The high-speed searching algorithms usually have a large number of decision branches: every point for analysis is defined by the previous results. The unpredictability of the search tracing and the latency of the memory access require loading the redundant number of pixels and calculating according to several possible traces. These factors reduce the engine efficiency.

On the other hand, the full search algorithms can be implemented with the help of a well-pipelined and parallelized structure that has high performance and is independent from the memory latency.

These considerations define the proposed structure of the preprocessor. The preprocessor comprises sub-modules of an image creator 120 and a rough search scheme 140.

The image creator 120 prepares the frame for the rough searching of MV. The image creator 120 uses the original pixels (luma only) and performs image compression. The transformed frame is represented by the vectors with a small bit depth (for example, 2 bits). One bit describes the average level of luma. If this bit is equal to 1, the luma is inside the range of the average value. The other bit describes the white or black level. Luma is represented by the states: "white", "average" or "black". The gap between the "white" and "black" allows reducing the noise influence. Such image compression saves the memory bandwidth, simplifies the logical and mathematical operations.

The transform of the luma bit depth depends on the average level. The average is a parameter to control the thresholds. The average level is defined at a local zone around the pixel. This allows supporting enough details of the level image for unerring search of ME.

The selection of the edges of objects for removing the illumination level is accompanied by conditioning (or sharpening) of the image. This removes the wrong definition of MV.

Rough Search of MV for Advanced Motion Vector Prediction

The rough motion estimation defines the prediction of motion (large blocks of images) with full-pel accuracy. The rough motion estimation uses pre-processed images and large window for searching. The size of a search window is defined by a parameter which allows scaling the unit.

A serial-parallel pipelined structure is used for a full search. This structure allows reusing the loaded data for definition of cost under different location inside of the search window. Reusing the data minimizes the number of transmissions from/to memory (the memory bandwidth).

By one approach, a double metric is used for search: weighted SAD and maximum correlation. The low bit-depth image allows implementing the SAD calculation (here an arithmetic operation of subtracting is replaced by a logical operation XOR) and detect the correlation coefficient between a reference coding block and a current coding block (an arithmetic operation multiplication is replaced by a logical operation AND). The double metric increases the safety (reliability) of estimation. The search is resulted in finding the winners among the MVs, which are selected according to the cost of these metrics (when there are several vector with the same cost, the winner is a vector with the minimal length).

Ways of Derivation of MV:

There are two ways of generating MV: prediction (spatial or temporal) and search. Both of these ways are used in the motion estimation. HEVC standard defines the selection of several most probable candidates based on the data from the adjacent prediction blocks (PB) and the reference picture (RP). The candidates are used in Advanced Motion Vector Prediction (AMVP) and Merge Modes (MM). Additionally, the preprocessor defines one possible candidate for Advanced motion estimation. The candidates of AMVP and MM are checked in parallel and compared with each other at the end.

Definition of AMVP Candidates.

The MV candidates are used as the possible starting point of searching (full search) of the best motion vectors for prediction blocks. By one approach, the derivation of AMVP candidates is performed in parallel with derivation of MM candidates using the same hardware units. In case when there is a strong limitation of hardware resource only one candidate may be used (a result of a rough search) as AMVP candidate. Otherwise, a list of possible candidates is created. The definition of AMVP candidates is performed as follows:

The engine uses a list, or table of predictions. The first prediction in the table is a result of a rough search. Further predictions are defined according to the rules of HEVC standard. To define the predictions, the left neighbors are needed, which will be available only after comparing the Inter Prediction with the Intra-Prediction. This creates a short-time back loop, which is a limitation for using the ME accelerator. In order to remove this back loop, the engine is constructed to assume that the left neighbor is always an Inter-prediction. The possible mistake can be removed by future encoding. The availability of the top neighbors is corrected by a mask which is updated by each string of frame.

All predictions in the table are ordered according to their probability. The check of the most probable candidates runs first.

The size of the table depends on the number of different predictions and available time for the search, and can change dynamically. The engine contains a timer to monitor the calculation time. This provides effective using of resources in real time.

There are temporal and spatial candidates. The spatial candidates are MVs, which were calculated with the help of the neighbors. The temporal candidates are defined from collocated coding blocks (CB). The table contains only unique vectors. Removing the repetitive candidates reduces the requirement to the memory bandwidth.

The candidates are created only for CU with the basis size, for example, 16×16. This is a compromise between the complexity and the quality of prediction. These candidates are used also to predict the coding blocks of smaller size.

The List of Candidates is a part of the List of Predictions. The List of Predictions is generated for CU from the minimal size up to the maximum size. The List of Predictions is used to select the index prediction, which is defined by the mapping of the merged results.

Definition of MV Candidates for the Merge Mode

MV candidates of Merge Mode are used as a possible decision. These vectors are checked, and the best motion vector is selected. Definition of the candidates requires the left neighbors (similar to AMVP), which will be available only after comparing the Inter Prediction to the Intra-Prediction. The engine uses the table (list) of predictions. This produces the short-time loop back. Again, similar to AMVP, the problem is solved by assuming that the left neighbor is always inter-prediction. The possible mistake is removed by future encoding. The availability of the top neighbors is corrected by a mask, which is updated by each string of frame. Thus, the ME engine supports a long-time loop back: final decisions of the encoding are returned back to ME 250.

All predictions in the table are ordered according to the rule of HEVC standard. There are temporal and spatial candidates. The spatial candidates are MVs, which were calculated with the help of the neighbors. The temporal candidates are defined from collocated coding blocks (CB).

The table contains only unique vectors. The size of the table can change dynamically. The size depends on the number of different predictions and available time for the search.

Engine contains timer to monitor the time of calculation. This provides effective using of resources in real time.

The candidates for checking are created only for CU with the basis size (16×16). This is a compromise between the complexity and prediction quality.

The list of candidates in Merge Mode is a part of the list of predictions. The list of predictions is generated for CU from minimal size up to maximum size. The list of predictions is used to select an index prediction, which is defined by the mapping of merged results.

Fine Search of MV for AMVP

The fine search of MV is performed in the full search module 240 inside a search window which is defined by a search algorithm. The search module is defined by the following requirements:

- A parallel-sequential architecture. The search is performed by reusing the previously loaded data; reusing of the data is provided by special structures with shift-registers;
- The minimal size of partition is restricted to 8×16 and 16×8, because the decrement of the partition size leads to the overhead increment of a coded stream (increases the number of MVs);
- An independent accumulation of SADs for each smallest partition in four planes (according to the number of the small partitions: 8×8 in 16×16 block);
- The definition of SADs for large partitions is made by using the combination of SADs for small partitions. Therefore, the calculations of SAD for large and small partitions are made simultaneously;
- The selection of the best MV depends on the distance from the initial (predicted) point of search. The decision with smallest distance from the initial value is selected among the decisions with the same SAD. This reduces the number of bits needed for MV coding.

Fractional Accuracy of Motion Vectors

In general, the fractional accuracy of MV is obtained by using the pixel interpolation and SAD estimation for interpolated blocks. Usually this method needs a substantial number of computations for definition of new SADs. These calculations can be removed by searching of the result in a field of SADs.

The interpolation of SADs allows defining the fractional parts of MVs. A matrix of SADs, which is generated during the full-pel search around the optimal block position, is used for interpolation.

The interpolation of SADs can be executed by using different methods. By one approach, a parabolic function is used to simplify the calculation. The suggested architecture of interpolation allows getting the fractional parts of motion vectors without any multiplication and division operations.

Figure 2:
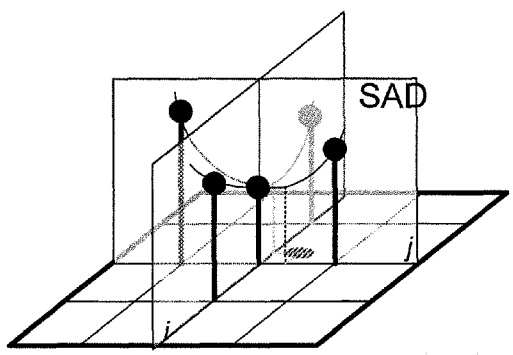
FIG. 2 shows a fractional adjustment for a motion estimation search.

The example of simplified calculation of the fractional part of MV with the help of parabolic function is shown in FIG. 2. The horizontal plain with a grid is a simplified space representation of the search window. The step of the grid is one pixel. Each node contains a vertical stub. The height of a stub is proportional to SAD of CU, when top-right corner of CU is placed in this node. The node with minimal SAD is the result of searching with full-pel accuracy (this is the central stub in FIG. 2). The parabolic approximation between stubs is used for definition of the minimum position between pixels. The fractional part of this position is the object of the calculation.

B-estimation of MV is defined by two best predictions for each reference. The SAD interpolation is a base for fractional adjustment of MV and definition of SAD of the result.

Decision Selection

The best MVs and PU modes inside of base CU (16×16) are defined by comparing the weighting SADs. The exponential penalty function is used to reduce the probabilities of selecting decisions with large motion vector difference (considering quant-parameter) at AMVP or prediction with larger index for Merge Mode. The exponential penalty function is implemented without multiplications and divisions operations.

The selection of a decision in Merge Mode is executed using only full-pel accuracy (inter-pixels interpolation is absent). The five best decisions of PU are defined as 1×(16×16), 2×(8×16) and 2×(8×16). The decisions with smallest SAD, weighted by index of prediction, are the winners.

The decision selection in AMVP Mode is executed using q-pel accuracy (inter-pixels interpolation is absent). The five best decisions of PU are calculated: 1×(16×16), 2×(8×16) and 2×(8×16). The decisions with smallest SAD, weighted by length of motion vectors difference, are the winners.

The selection of AMVP/Merge modes is made by comparing the Merge Mode winner to the AMVP winner.

Storage of MV Candidates

The storage buffers for the unique MV candidates are organized in a special way, which allows, by removing the repeatability, to reduce the number of MVs to be compared in order to detect the new unique vectors, and to reduce the size of the buffers. There are two types of buffers. One type is used to store the AMVP; another—for the merged MV. The knowledge of the way of generating MV allows using it for packaging the MVs.

The best MV in the advanced mode is a result of full search inside of small window. The result of searching is a set of 5 MV (for 5 prediction units). These vectors differ by less than 16 (for each coordinate if the search window is less than 32×32). The common part can be separated from a 4-bit variable part. The common part equals to the position of the search window (top-left corner). For the variable part 4 vectors can be packed into one 32-bits word. The fifth vector is placed together with the common part. The checking of repeatability takes three steps: first, comparing the references; second, comparing the common parts and, finally, comparing the differences. It can be seen that the MVs form a tree, which provides the comparing of groups. MVs in the Merge Mode are defined by neighbors. The number of MV candidates is the same or less. The size of each coding tree unit (CTU) is restricted to 64×64. For each CTU there are no more than 16 unique motion structures that are taken from spatial neighbors and 16 motion structures that are taken from temporal neighbors. If the maximal size of frame is 4k×2k, 12 bits are enough to represent the motion vectors (full-pel accuracy). The MVs are divided into the parts of 4 most significant bits (MSB) and 8 less significant bits (LSB). The division of bits on MSB and LSB is used for definition of weight bits in the samples. Usually 2 bytes (16 bits) are used for storage of 10-bits samples. The extra 6 bits are the unused, or insignificant bits which can be removed to provide more storage. The MSB of 4 motion vectors can be packed into one 32-bits word. Thus, three words can cover 4 MVs.

The storage buffer for motion information is divided into three parts. The first part stores the MSB. The size of buffer is 16×32 bits. The second part stores reference indexes and the numbers of vectors with LSB (0 or 1). This is a very small part of the buffer (16×5 bits registers) and can be implemented with registers. The last part of the buffer stores the less significant bits of the motion vectors. The zero-vectors are not included into these buffers. They are compared and coded separately from non-zero vectors using reference indexes.

The fractional parts of MVs are separated from integer parts because all the operations of comparing and loading are executed with full-pel accuracy only. The fractional parts of MV are included only during the generation of final decision. The fractional parts (2+2 bits for each MV) are stored separately in the CU prediction tables. The position of the fractional part of MV in tables is defined by the CU index in the CTU and is identified by the descriptor. The fractional parts are added to integer part of the winner MV after merging of partitions inside the CTU.

Merge of Partitions

The prediction units (PU) and coding units (CU) of big size cannot have SAD (without weighting) smaller than the sum of the small PU and CU, which cover this big CU. The improvement of coding can be achieved only by reduction of losses by coding of headers. So, changes of MV of small PB, which was defined as optimal, increase the SAD of the merged PB. On the other hand, the fractional part of MV primarily reflects the effect of quantization noise. This allows using the MVs which are rounded up to full-pel accuracy. Comparing MV of the neighbors for five different partitions defines the rule of PU merging. If the neighbors have exactly the same full-pel motion vectors, these units can be merged. Thus, the Coding Tree is created without additional SAD re-calculation.

The proposed method uses a unique signature of MV instead of the real MV structures for reduced hardware requirements. The ME contains a big number of comparisons of the motion vectors structures. The comparisons are simplified for reducing hardware recourses. For this purpose, each unique structure with motion vectors is replaced by a unique signature (descriptor). The bit depth of the descriptor is significantly less than the size of the MV structure. In fact, the descriptor is an address of the cell memory where the unique motion vector structure is located. The rule of generating the descriptors provides a simple way to return to real MV.

The ME engine provides the q-pell accuracy of estimation. The motion estimation does not need a stage of motion compensation with q-pel interpolation. The fractional parts, which were detected during the analyzing of the base CU (16×16), are stored in the special buffer. After merging of the prediction units the fractional parts are added to the final result by simple weighting of the fractional parts, which covers the final partition.

Merging of PB into the bigger PB without SAD re-calculation reduces the memory bandwidth requirement.

The proposed structure provides a Motion Estimation algorithm and the derivation of a Coding Tree Unit as described below.

Algorithmic Methods for Motion Estimation

The proposed motion estimation algorithm comprises:

1. Creating a reference image for encoding of the next frame using the sequential transformation of original luma samples of the current frame (process of binarization) according to an algorithm of binarization;
2. Storing the transformed image in Frame Image Buffer;
3. Performing rough motion estimation according to Algorithm of Rough Searching, wherein the rough estimation is completed in the Transformed Images space;
4. Storing the results of searching, the MV for coding unit 16×16, in MV Buffer;
5. Generating the candidates for Merge Mode and for AMVP Mode;
6. Removing all of the repetitive MV (MV are rounded to full-pel accuracy) from the List of predictions;
7. Placing the unique MV into the vector Buffer according to MV descriptor, wherein the descriptor is an address;
8. Placing the fractional parts of MV into the MV buffer according to the index number of PU inside CTU.
9. Loading the reference blocks from the Reference buffer; the candidate from Merge Mode list defines the placement of the reference block;
10. Defining SAD for 5 partitions (1×(16×16), 2×(8×16), 2×(16×8)) calculating SAD using a current CU and its prediction from a reference picture;
11. Comparing the weighted SAD of a current candidate to the weighted SAD of a previous candidate (if applicable) for each of the 5 partitions; storing the best candidates with SAD into MM estimator;
12. Repeating steps 9, 10, and 11 until all candidates are considered or calculation time is expired;
13. Loading the result of rough estimation from MV buffer, and placing this vector into the Advanced Mode list of candidates;
14. Loading the Search Window from the Reference buffer; the candidate from the Advanced Mode List defines the placement of the search window block in the Reference buffer;
15. Performing a full search of the best MV inside the loaded window; the best MVs for 5 possible partitions (16×16, 2×(8×16), 2×(16×8)) are defined by comparing of the weighted SAD for different positions of the prediction; run the searching according to the Fine Search Algorithm;
16. Comparing the weighted SAD of the current candidate with the weighted SAD of the previous candidate (if applicable); executing the comparison for each 5 partitions; storing the best candidates with SAD;
17. Repeating the steps 14, 15, and 16 until all of the candidates are found or calculation time expires;
18. When steps 12 and 17 are completed, comparing the results of the estimations of the Merge Mode and the Advanced Mode and saving the best decisions for each of the 5 partitions into the selector;
19. Repeating the steps 3-18 for all 16×16 CU in the Coding Tree Unit (CTU); and
20. Executing the Merge algorithm using Total List of Unique MV in Tree Creator.

Algorithm of Binarization

The Binarization Algorithm comprises the following steps:
defining the local average—M, preferably calculating it as a moving average with the help of 2D-band_pass convolution kernel. Alternatively, defining the moving average using the sum with exponential forgetting;
conditioning (or sharpening) the image; calculating a new value PN as PN=P+(P−M) for current pixel P;
defining the threshold for binarization: THR=(M+8)>>4; and
calculating the value of the binary image pixel PB as:

$$PB = PN <= (M-THR)?2'b00:PN >= (M+THR)?2'b01:2'b10;$$

wherein the equation is presented in Verilog.
The result of the calculation is as follows:
If PN is less or equal to M−THR, then PB is 0;
If PN is more or equal to M+THR, then PB is 1;
Otherwise, PB is 2.

Algorithm of Rough Searching

The best matching position is searched with two metrics to correct the possible mistakes in ME (since the local extremums can produce a wrong detection of position). The algorithm comprises:
providing a first metrics based on calculation of sum of abs difference for binary image;
providing a second metrics based on calculation of correlation coefficients; and
performing final estimation and selecting a motion vector with the smallest length.

Fine Search Algorithm

The Fine Search Algorithm comprises integer motion estimation (IME) and a fractional adjustment of motion vectors. The IME runs in sequentially-parallel mode. The algorithm comprises:
- defining SADs for each quadrant;
- merging defined SADs according to the geometry of a partition;
- detecting the position with the minimum SAD;
- saving SADs of the best position and SADs around this position;
- defining fractional parts for said SADs;
- removing indeterminacy selection of positions with equal SADs using distance between the selected position and the center;
- providing fractional adjustment of the best decisions with Q-pel accuracy of ME;
- providing the fractional adjustment preferably using parabolic approximation of SAD samples.

Merge Algorithm

The Merge algorithm is used to merge small partitions into large ones. The merging is possible if neighboring partitions have the same motion vectors.

The proposed method of merging the partitions comprises the following steps:
- a. identifying each full-pel MV of the 5 partitions (1×(16×16), 2×(8×16), 2×(16×8)) by a unique descriptor;
- b. comparing descriptors of the neighbors for the 5 partitions;
- c. merging pairs of partitions with equal full-pel motion vectors into at least one coding unit; and
- d. repeating the merging of coding units until the size of the coding unit is less than a predetermined maximum size.

Figure 3:
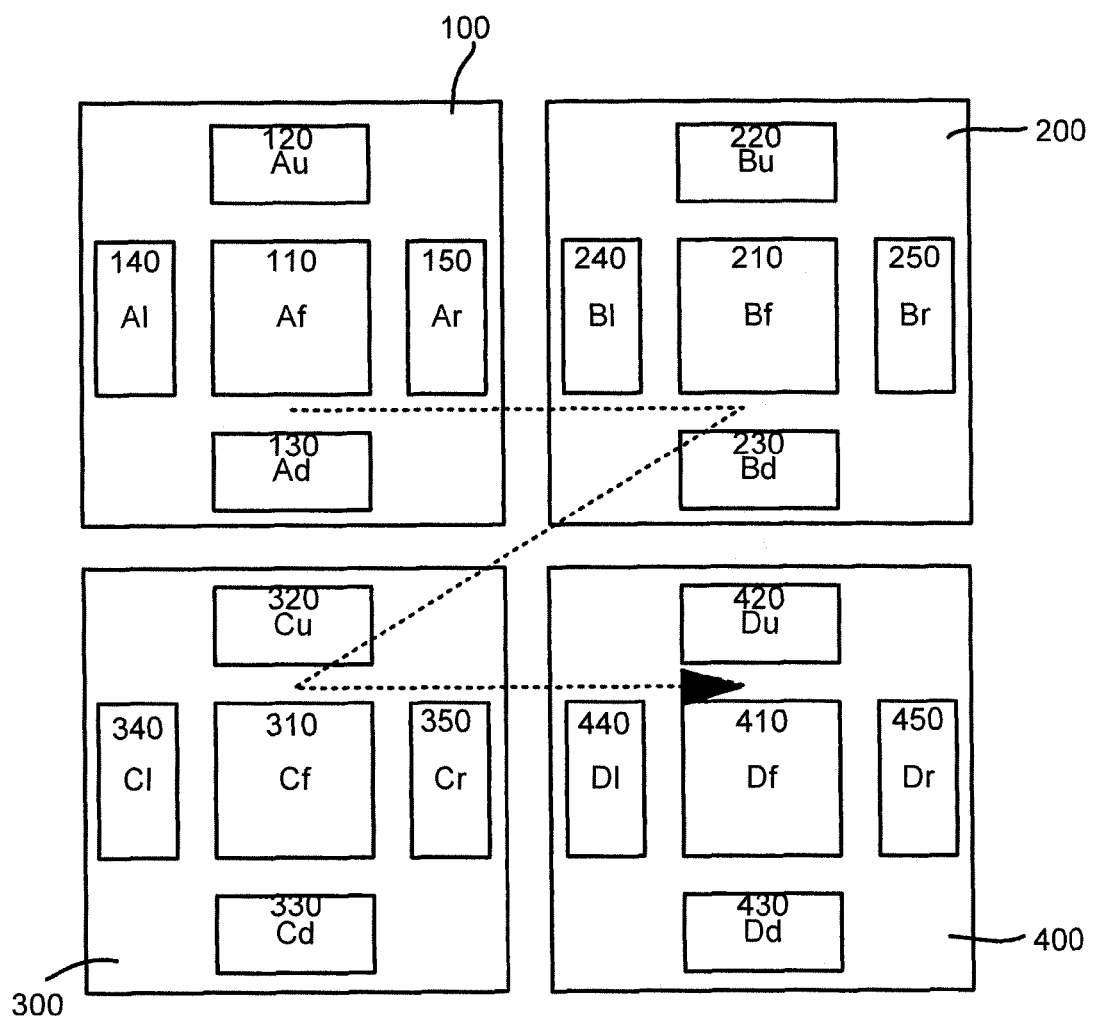
FIG. 3 represents a diagram of a merge algorithm for a coding unit CU with 5 partitions.

FIG. 3 shows an embodiment of the merge algorithm using a diagram of four neighboring CU indicated as (100), (200), (300) and (400). Each CU is represented as a structure with five partitions. The CUx00 has partitions x10, x20, x30, x40 and x50, where symbols x may equal to 1, 2, 3, or 4. Each partition is described by identifier (or descriptor). Each unique MV structure has a unique descriptor. First CU in FIG. 3 has descriptors Af (110), Au (120), Ad (130), Al (140) and Ar (150); second CU has descriptors Bf (210), Bu (220), Bd (230), Bl (240) and Br (250); third CU has descriptors Cf (310), Cu (320), Cd (330), Cl (340) and Cr (350); and the fourth CU has descriptors Df (410), Du (420), Dd (430), Dl (440) and Dr (450). Indexes in descriptors are used for marking the partitions. The descriptors with index u are used for horizontal upper partitions; the descriptors with index d are used for horizontal bottom partitions; the descriptors with index l—for vertical left, the descriptors with index r—for vertical right, and the descriptors with index f—for square. The descriptors are found by comparing decisions for 16×16 CU so that the descriptors define the optimal MVs among all considered decisions.

Comparing and merging of the MVs goes sequentially as blocks are ready. The dotted line in FIG. 3 indicates the order of calculation. The merging of PU and CU is started with 16×16 CUs, and the algorithm is repeated for merged CU while the size of CU is less than maximum possible size:

1. If descriptors Af=Bf=Cf=Df, the partitions Af, Bf, Cf and Df are merged into one CU-go to Step 9; otherwise—go to step 2;

2. If descriptors Af=Bf and Cf=Df, pairs of partitions [Af, Bf] and [Cf, Df] are merged into two CU-go to Step 9; otherwise—step 3;

3. If descriptors Af=Cf and Bf=Df; pairs of partitions [Af, Cf] and [Bf, Df] are merged into two CU-go to Step 9; otherwise—step 4;

4. If descriptors Bf=Df; Ar=Bf, Cr=Df and Al=Cl, pairs of partitions [Ar, Cr, Bf, Df] and [Al, Cl] are merged into two CU-go to Step 9; otherwise—step 5;

5. If descriptors Af=Cf; Af=Bl, Cf=Dl and Br=Dr, pairs of partitions [Af, Cf, Bl, Dl] and [Br, Dr] are merged into two CU-go to Step 9; otherwise—step 6;

6. If descriptors Af=Bf; Af=Cu, Bf=Du and Cd=Dd, pairs of partitions [Af, Bf, Cu, Du] and [Cd, Dd] are merged into two CU-go to Step 9; otherwise—step 7;

7. If descriptors Cf=Df; Ad=Cf, Bd=Df and Au=Bu, pairs of partitions [Ad, Bd, Cf, Df] and [Au, Bu] are merged into two CU-go to Step 9; otherwise—step 8;

8. Merging is stopped.

9. Steps 1-8 are repeated until the size of CU is less than maximum size.

Correspondence of the MV descriptors to the real MV structure (back reflection) is defined by the address of the cell with MV identified by the descriptor in the Unique MV Buffers.

The fractional parts of MVs are stored separately from integer parts in the MV prediction tables, and a position of the fractional part of a motion vector in the tables is defined by a descriptor. For calculation of the fractional parts after the merging, the fractional parts of MV can be defined by the weighted average estimation of the fractional parts of the merged PU. After merging of partitions inside the CTU the fractional parts are added to the integer part of the best MV. The structure of the coding tree unit is completed.

The preceding description is intended to be illustrative of the principles of the invention, and it will be appreciated that numerous changes and modifications may occur to those skilled in the art, and it is intended in the appended claims to cover all those changes and modifications which fall within the true spirit and scope of the present invention.

The invention claimed is:

1. A method of motion estimation for video coding, comprising:
- creating a transformed reference image for encoding a frame by sequentially transforming original luma pixels, and storing the transformed image in a frame image buffer;
- performing rough motion estimation in transformed image space, and storing resulted motion vectors MV for a coding unit CU 16×16 into a MV buffer;
- generating a merge mode list of MV candidates and an AMVP mode list of MV candidates;
- removing repetitive vectors from the lists and storing unique merge mode MV according to MV identifiers;
- storing fractional parts of MV according to an index number of a prediction unit PU inside a coding tree unit CTU;
- loading reference blocks from a reference buffer into a merge motion estimator;
- defining SAD for 5 partitions (1×(16×16), 2×(8×16), 2×(16×8)), which are calculated using a current CU and its prediction from a reference picture;
- comparing a weighted SAD of a current MV candidate to a weighted SAD of a previous MV candidate for each of the 5 partitions and storing the best merge mode MV candidates with SAD;
- repeating steps of loading reference blocks, defining SADs and comparing weighted SADs until all MM candidates are considered, or until the end of predetermined calculation time;

loading resulting MV of rough estimation from MV buffer into AMVP list of candidates;

loading a search window from the reference buffer according to the MV candidates from the AMVP list;

performing a full search of best MV candidates inside the loaded window;

comparing the weighted SAD of the current MV candidate with the weighted SAD of the previous MV candidate for each 5 CU partitions, and storing the best AMVP candidates with SAD;

repeating steps of loading search window to storing the best AMVP candidates until all of the AMVP candidates are considered, or until the end of predetermined calculation time;

comparing estimation results of the Merge Mode and the AMVP Mode and selecting best decisions for each of the 5 CU partitions;

repeating motion estimation for all 16×16 CU in the Coding Tree Unit (CTU); and merging neighboring partitions according to MV identifiers using entire list of best MV candidates.

2. The method of motion estimation of claim 1, wherein the MV are rounded to full-pel accuracy.

3. The method of motion estimation of claim 1, wherein the MV identifier is an address of a cell memory where the MV is located.

4. The method of motion estimation of claim 1, wherein the MV candidate from the Merge Mode list defines placement of the reference block in the reference buffer, and the candidate from the AMVP mode list defines placement of the search window in the reference picture.

5. The method of motion estimation of claim 1, wherein the best MVs for 5 partitions (16×16, 2×(8×16), 2×(16×8)) are defined by comparing the weighted SAD for different predictions.

6. The method of motion estimation of claim 1, wherein the step of creating the reference image is performed using binarization algorithm, comprising:

defining a local average M;

calculating a new value PN=P+(P−M) for current pixel P to provide image sharpening;

defining a threshold for binarization: THR=(M+8)>>4; and calculating a value of binary image pixel PB as:

$$PB = PN <= (M-THR) ? 2'b00 : PN >= (M+THR) ? 2'b01 : 2'b10.$$

7. The method of motion estimation of claim 5, wherein the local average M is calculated as a moving average with the help of 2D-band pass convolution kernel.

8. The method of motion estimation of claim 6, wherein the local average M is calculated as a moving average using a sum with exponential forgetting.

9. The method of motion estimation of claim 1, wherein the rough motion estimation is performed according to Rough Searching Algorithm, comprising:

searching for a best matching position with two metrics, wherein the first metrics is based on calculation of a sum of absolute difference for binary image; and the second metrics is based on calculation of correlation coefficients; and selecting a final estimation of the motion vector as a vector with the smallest length.

10. The method of motion estimation of claim 1, wherein the full search is performed according to Fine Search Algorithm comprising:

performing an integer motion estimation (IME) in sequentially-parallel mode; and performing fractional adjustment of best motion vectors using parabolic approximation of SAD samples to achieve q-pel accuracy of the motion estimation;

wherein IME comprises:

defining SADs of each quadrant and merging the SADs according to geometry of a partition;

detecting a best position as a position with a minimum SAD; and saving the best position and SADs around the best position.

11. The method of motion estimation of claim 1, wherein merging the partitions comprises:

identifying each full-pel MV of the 5 partitions (1×(16×16), 2×(8×16), 2×(16×8)) by a unique descriptor;

comparing descriptors of the neighbors for the 5 partitions;

merging pairs of partitions with equal full-pel motion vectors into at least one coding unit; and repeating the merging of coding units until the size of the coding unit is less than a predetermined maximum size.

12. The method of motion estimation of claim 1, further comprising calculating the factional parts of the MV and adding the fractional parts to a integer part of the best MV after merging of partitions inside the CTU, wherein the fractional parts of MV are defined by weighted average estimation of the fractional parts of merged prediction units.

13. The method of motion estimation of claim 12, wherein the size of the CTU is 64×64, the CTU comprising no more than 16 unique MV taken from spatial neighbors and 16 MV taken from temporal neighbors, each MV divided into parts of 4 MSB bits and 8 LSB bits for compact storage and quick comparison.

14. The method of motion estimation of claim 12, wherein the fractional parts of MVs are stored separately from integer parts in the MV prediction tables, and a position of the fractional part of a motion vector in the tables is defined by a descriptor.

* * * * *

UNITED STATES PATENT AND TRADEMARK OFFICE
CERTIFICATE OF CORRECTION

PATENT NO. : 9,106,922 B2  
APPLICATION NO. : 13/836174  
DATED : August 11, 2015  
INVENTOR(S) : Mikhail Fludkov et al.

Page 1 of 1

It is certified that error appears in the above-identified patent and that said Letters Patent is hereby corrected as shown below:

IN THE CLAIMS:

Claim 7, Column 13, Line 48: Change "claim 5" to -- claim 6 --.

Signed and Sealed this  
Eighth Day of March, 2016

Michelle K. Lee  
*Director of the United States Patent and Trademark Office*